I. C. BENSON.
REEL ATTACHMENT FOR MOWING MACHINES AND HARVESTERS.
APPLICATION FILED SEPT. 18, 1911.
1,026,486.
Patented May 14, 1912.
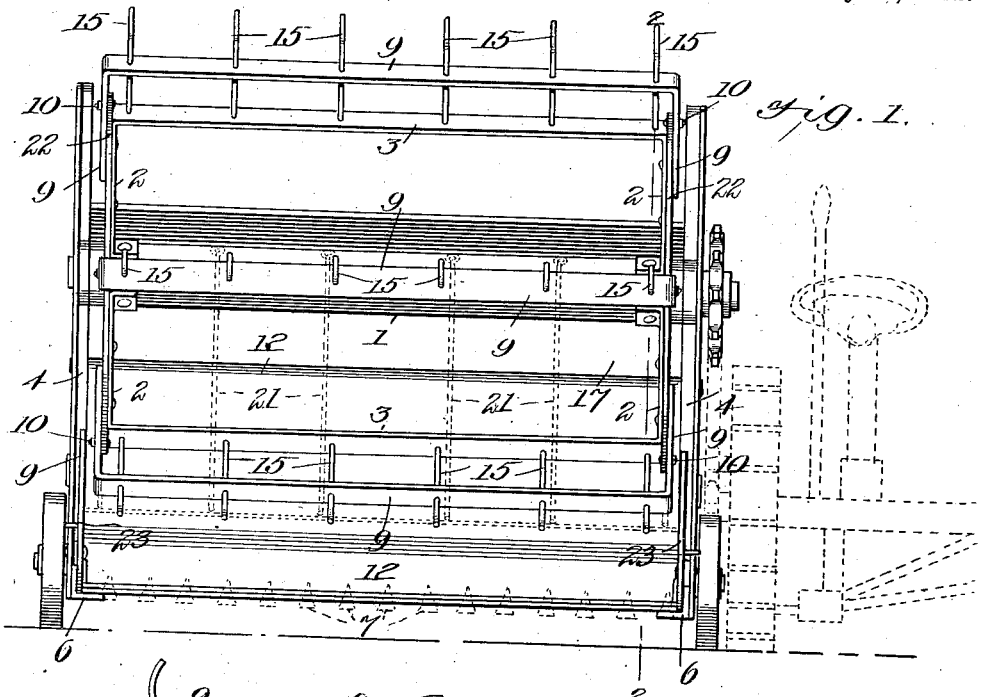
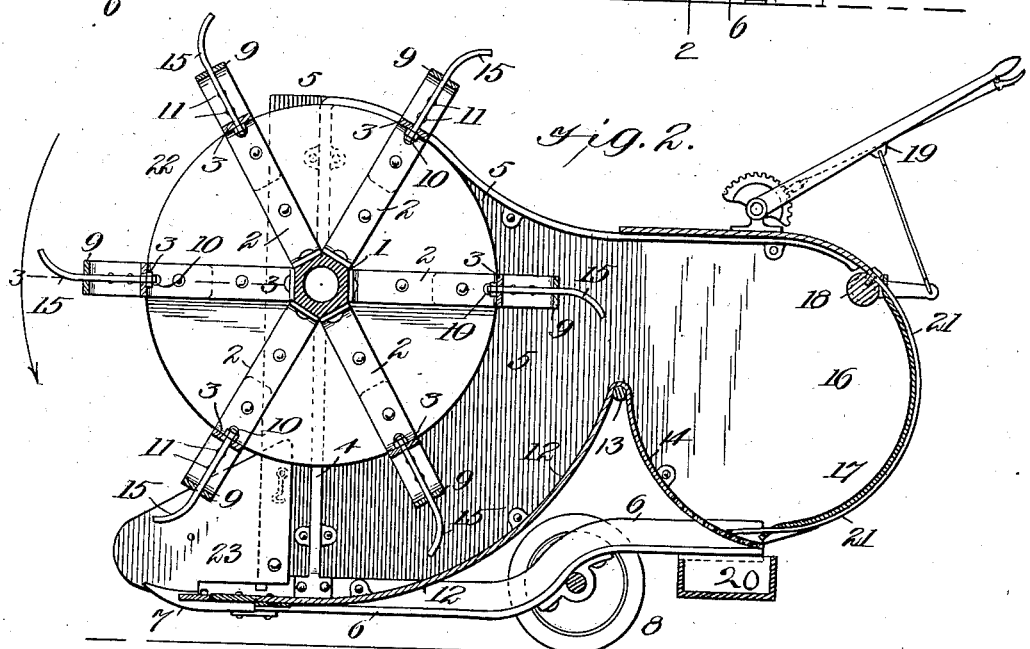
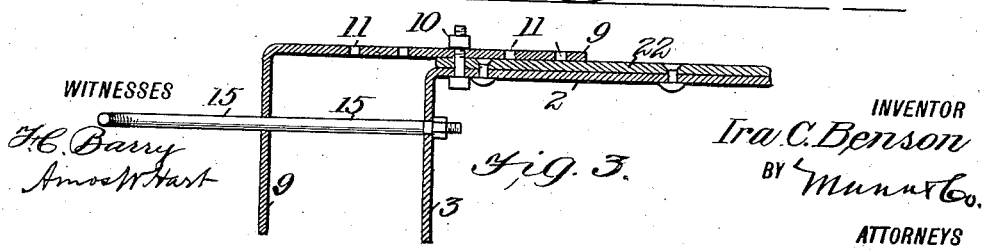
WITNESSES
H. C. Barry
Amos W. Hart
INVENTOR
Ira C. Benson
BY Munn & Co.
ATTORNEYS

UNITED STATES PATENT OFFICE.

IRA C. BENSON, OF HULETT, WYOMING.

REEL ATTACHMENT FOR MOWING-MACHINES AND HARVESTERS.

1,026,486.  Specification of Letters Patent.  Patented May 14, 1912.

Application filed September 18, 1911. Serial No. 649,826.

*To all whom it may concern:*

Be it known that I, IRA C. BENSON, a citizen of the United States, and a resident of Hulett, in the county of Crook and State of Wyoming, have invented an Improved Reel Attachment for Mowing-Machines and Harvesters, of which the following is a specification.

My attachment is designed for use in cutting and saving short grass and grain, and is particularly applicable and valuable in the arid or semi-arid portions of the country or wherever drouth prevails. The reel proper is provided with bars or blades which are adapted for adjustment radially, so that they may be set farther from or nearer to the reel shaft according to the height of the standing grass or grain.

The details of construction, arrangement, and operation of my invention are as hereinafter described and illustrated in the accompanying drawing, in which—

Figure 1 is a front view of the reel shown in connection with a supporting frame and a hood in which it is partly inclosed. Fig. 2 is a vertical transverse section on the line 2—2 of Fig. 1. Fig. 3 is an enlarged section on the line 3—3 of Fig. 2.

The reel proper comprises a central polygonal shaft 1, a series of radial arms or spokes 2 which are connected by transverse bars 3 arranged parallel to the shaft. The ends of the shaft 1 are reduced and form journals by which the reel is supported and adapted to rotate in bearings provided by vertical brackets 4 that are attached at the bottom to the sides of the hood 5 and to a base frame 6. The whole attachment, including the sickle-bar 7, is supported upon small truck wheels 8.

A special feature of the reel is the provision and attachment of a series of transverse bars 9 which are arranged parallel to the reel bars 3, but separated therefrom by a narrow space, as indicated in Fig. 2. These bars are preferably constructed of plate iron and their ends are bent inward and overlap the end portions of the spokes 2 and are secured together adjustably by means of screw-bolts 10 passing through holes 11 in the two parts. Thus the bars 9 may be adjusted radially toward or from the inner bars 3 and the shaft 1, which adjustment adapts the reel to act effectively on standing grass or grain of different heights, it being understood that the bars 9 will be adjusted farther from the reel bars 3 when the grass or grain is short than when the same is of moderate length, so that as the reel revolves in the direction of the arrow (Fig. 2), the bars or blades 9 strike the grass or grain and carry it into contact with the sickle-bar 7, thus insuring its being severed and delivered into the hood beneath the reel.

From the sickle-bar an imperforate metal bottom 12 extends rearward and upward, thus forming an imperforate concave concentric with the reel shaft. At the upper end of the concave, a transverse rod or other due support 13 is provided and on the rear side of this there is another concave 14 down which the grass or grain slides when delivered from the front concave 12.

In order to sweep the grass or grain over the concave 12, the reel is provided with a series of teeth 15 which pass through the bars 3 and blades 9, as shown, their outer ends being curved backward or contrary to the direction of rotation of the reel. This construction and arrangement of the teeth 15 enables them to sweep the grass or grain over the concave and to free themselves from it at the point 13 where the same passes over the top of the concaves and slides down the rear concave 14. The inner ends of the teeth are fixed to the bar 3 and their outer portions are adapted to slide in the holes in the outer transverse bars 9, which obviously permits radial adjustment of the latter. The grass or grain thus delivered into the rear chamber 16 may be discharged therefrom at the will of the operator of the machine, the rear concave portion 17 of such chamber constituting a dropper which is hinged at 18 to a transverse rotatable shaft provided with a lever attachment 19 for rotating it. The dropper 17 has curved spring teeth 21 whose front ends rest on the concave 14. A trough-like receptacle 20 receives the shattered or detached grain which drops through holes in the rear concave 14. Large disks 22 are applied at the ends of the reel.

The reel may be rotated by a chain and sprocket gear connected with the driving mechanism of the machine, as indicated in part by dotted lines in Fig. 1.

As a still further means of preventing side winds from blowing away the short tops of the severed grass or grain, I employ broad and long plate dividers 23, as shown.

I thus provide a reel attachment which is applicable not only to new machines, but also to most of those already in use, whereby short grass or grain may be mown and harvested and thereby saved with the same facility as taller grass or grain.

What I claim is:—

The combination, with the reel frame having radial spokes at its ends and transverse bars connecting the outer ends of said spokes, of the adjustable attachment comprising bars (9) which are arranged exterior and parallel to the first-named or spoke bars, and having parallel end portions that overlap and lie against the spokes, and means for adjustably connecting the lapped portions, as described.

IRA C. BENSON.

Witnesses:
SOLON C. KEMON,
AMOS W. HART.

Copies of this patent may be obtained for five cents each, by addressing the "Commissioner of Patents, Washington, D. C."